U S008246429B2

(12) United States Patent
Hilgren et al.

(10) Patent No.: US 8,246,429 B2
(45) Date of Patent: Aug. 21, 2012

(54) APPARATUS AND METHOD FOR CLEANING POULTRY

(75) Inventors: John D. Hilgren, Shoreview, MN (US); Scott P. Bennett, Stillwater, MN (US); Gabriel M. Miller, Lodi, WI (US)

(73) Assignee: Ecolab USA Inc., St. Paul, MN (US)

( * ) Notice: Subject to any disclaimer, the term of this patent is extended or adjusted under 35 U.S.C. 154(b) by 921 days.

(21) Appl. No.: 11/903,889

(22) Filed: Sep. 25, 2007

(65) Prior Publication Data

US 2008/0020694 A1    Jan. 24, 2008

Related U.S. Application Data

(62) Division of application No. 10/755,089, filed on Jan. 8, 2004, now Pat. No. 7,288,274.

(51) Int. Cl.
*A22C 17/08* (2006.01)

(52) U.S. Cl. ....................................... 452/173; 452/123

(58) Field of Classification Search .................. 452/123, 452/173
See application file for complete search history.

(56) References Cited

U.S. PATENT DOCUMENTS

| | | | |
|---|---|---|---|
| 2,557,335 A * | 6/1951 | Barker | 452/52 |
| 2,723,421 A | 11/1955 | Smith et al. | |
| 3,689,958 A * | 9/1972 | Dillon | 99/517 |
| 3,803,669 A | 4/1974 | Dillon | |
| 4,196,221 A * | 4/1980 | Dew | 426/235 |
| 4,557,016 A | 12/1985 | Markert | |
| 5,041,054 A | 8/1991 | Van Den Nieuwelaar et al. | |
| 5,178,579 A * | 1/1993 | Simmons | 452/123 |
| 5,482,503 A | 1/1996 | Scott et al. | |
| 5,484,332 A | 1/1996 | Leech et al. | |
| 5,882,253 A | 3/1999 | Mostoller | |
| 6,213,864 B1 * | 4/2001 | Griffiths et al. | 452/173 |
| 6,220,952 B1 | 4/2001 | Taylor, Sr. et al. | |
| 6,514,556 B2 | 2/2003 | Hilgren et al. | |
| 6,733,379 B2 * | 5/2004 | Tsang | 452/173 |
| 7,288,274 B2 | 10/2007 | Hilgren et al. | |
| 2002/0090904 A1 * | 7/2002 | Tieleman et al. | 452/173 |

FOREIGN PATENT DOCUMENTS

WO    WO 99/35916    7/1999

* cited by examiner

*Primary Examiner* — David Parsley
(74) *Attorney, Agent, or Firm* — Andrew D. Sorensen; Laura C. DiLorenzo

(57) ABSTRACT

An apparatus (10) for washing eviscerated poultry carcasses (12) has a housing (11), a conveyor (15*a*) for moving the shackled poultry carcasses through the housing. A guide bar (24) tilts the poultry carcasses (12) from a vertical position for spraying by a first set of nozzles (23). The first set of nozzles (23) delivers a cleaning solution (100) at a sufficient flow rate and line pressure, whereby a portion of the cleaning solution (100) is deflected back out the rear opening (12*d*) of the poultry carcass (12).

6 Claims, 7 Drawing Sheets

APPARATUS AND METHOD FOR CLEANING POULTRY

CROSS-REFERENCE TO RELATED APPLICATION(S)

This application is a divisional application of U.S. application Ser. No. 10/755,089, now U.S. Pat. No. 7,288,274, entitled "APPARATUS AND METHOD FOR CLEANING POULTRY", filed on Jan. 8, 2004.

BACKGROUND

This invention relates to an apparatus and method for cleaning poultry and more particularly to an apparatus and method wherein a diffused stream of cleaning fluid enters the rear end opening of an eviscerated poultry carcass from a direction, and at a sufficient volume over time, so that the cleaning fluid is deflected out the rear end opening and beneath loose-hanging tissue hereafter referred to as "abdominal fat flaps".

All poultry carcasses entering the processing environment are contaminated with bacteria, some with pathogenetic bacteria such as *Salmonella*. Fecal matter, poultry litter and dirt are the main sources of this contamination. As a result of such contamination, poultry is typically washed at any of several steps during the process of converting a live bird to an edible food product. Such washing aims to remove dirt, offal, blood, viscera, other debris and microbes from the poultry. Removing or reducing microbes aids the safe storage and consumption of poultry, yet many existing washing procedures fail to significantly reduce the microbe burden on poultry. The potential for poultry skin to become cross-contaminated is worsened by the ability of all types of bacteria to adhere within only 15 seconds of contact. Once in the processing environment, a significant number of carcasses can become cross-contaminated with pathogens during handling, scalding, mechanical processing and chilling. Current methods for many of those procedures also fail to significantly reduce the microbe burden on poultry.

One method of cleaning the poultry is the use of inside-outside bird washers. Such inside-outside bird washers wash the inside cavity by spraying a cleaning fluid through a probe inserted into the cavity while the carcass travels along a conveyor. While such washers are useful, there is always the possibility of cross contamination because of the probe being inserted into the cavity of one bird and then into a cavity of another bird. Another method of cleaning poultry is the use of flood washers. Flood washers wash the cavity by filling the cavity with a non-diffused stream of cleaning fluid via flood nozzles while the carcass travels along a conveyor. Other types of washers spray the poultry on the outside and inside of the cavity, with the cleaning solution sprayed inside of the cavity draining out the neck opening, as the poultry is hung upside down by its legs. The use of a peroxyacetic acid and peroxyoctanoic acid, as described in U.S. Pat. No. 6,514,556, has been effective in reducing microbial contamination in poultry.

In cleaning the poultry carcass, an additional problem is the abdominal fat flaps. These flaps are the result of a midline cut of the abdominal skin between the breast bone and the cloaca (anus) that allows viscera to be removed. These two flaps are adjacent to the rear opening and are difficult to clean. Further, they tend to trap the bacteria or other contaminants that are attempting to be cleaned. The flaps are connected to the side of the rear opening and flop over the opening. The prior art flood methods do not have a good mechanism for cleaning underneath the flaps because they apply the cleaning solution on top of the flaps while the carcass is hanging by the legs in a vertical position. When the carcass is hanging vertical, the natural condition of the flaps is to fall inside the cavity creating a pocket that is shielded from cleaning. Applying the cleaning solution on top of the flaps reduces their ability to be lifted up so the pocket area can be cleaned. It has often been found that when there are problems with cleaning efficacy, it was due to insufficient cleaning/sanitizing of the inside cavity.

While the foregoing have proved useful and effective in reducing microbial contamination in poultry, it is always advantageous to provide advancements in the development of the reducing of the microbial contamination.

SUMMARY

In one embodiment, the invention is a method of washing eviscerated poultry carcasses. The poultry carcasses have legs, an exterior surface, a cavity having a rear end opening and a neck end. The method includes conveying the carcasses, hung by the legs, through a housing. The cavity is sprayed with a cleaning fluid that enters the rear end opening from a direction and at a sufficient volume over time whereby a portion of the cleaning solution is deflected out of the rear end opening. The exterior surface is sprayed with a cleaning solution.

In another embodiment, the invention is an apparatus for washing eviscerated poultry carcasses having legs, an exterior surface, a cavity having a rear end opening and a neck end. The apparatus includes a conveyor for conveying the poultry carcasses. A housing has an inlet and an outlet through which the poultry carcasses pass. A guide bar is positioned in the housing and positioned to contact the poultry carcasses and raise the neck ends to tilt the poultry carcasses from vertical. A first set of multiple spray nozzles provide for a diffused stream of cleaning fluid into the cavity from a direction and at a sufficient volume over time, whereby a portion of the cleaning fluid is deflected out the rear opening and beneath the flaps and a second set of multiple spray nozzles are provided for spraying the exterior surface with a cleaning solution.

In another embodiment, the invention is a method of washing eviscerated poultry carcasses, the poultry carcasses having legs, an exterior surface, a cavity having a rear-end opening, and a neck end. The method includes conveying the carcasses, hung by the legs, through a housing. The cavity is sprayed with a cleaning fluid that enters the rear end opening, the cavity having a volume and a volume of the cleaning solution being at least one-fourth of the volume of the cavity. In a preferred embodiment, the cleaning fluid enters in less than 0.4 seconds.

DETAILED DESCRIPTION

Figure 1:
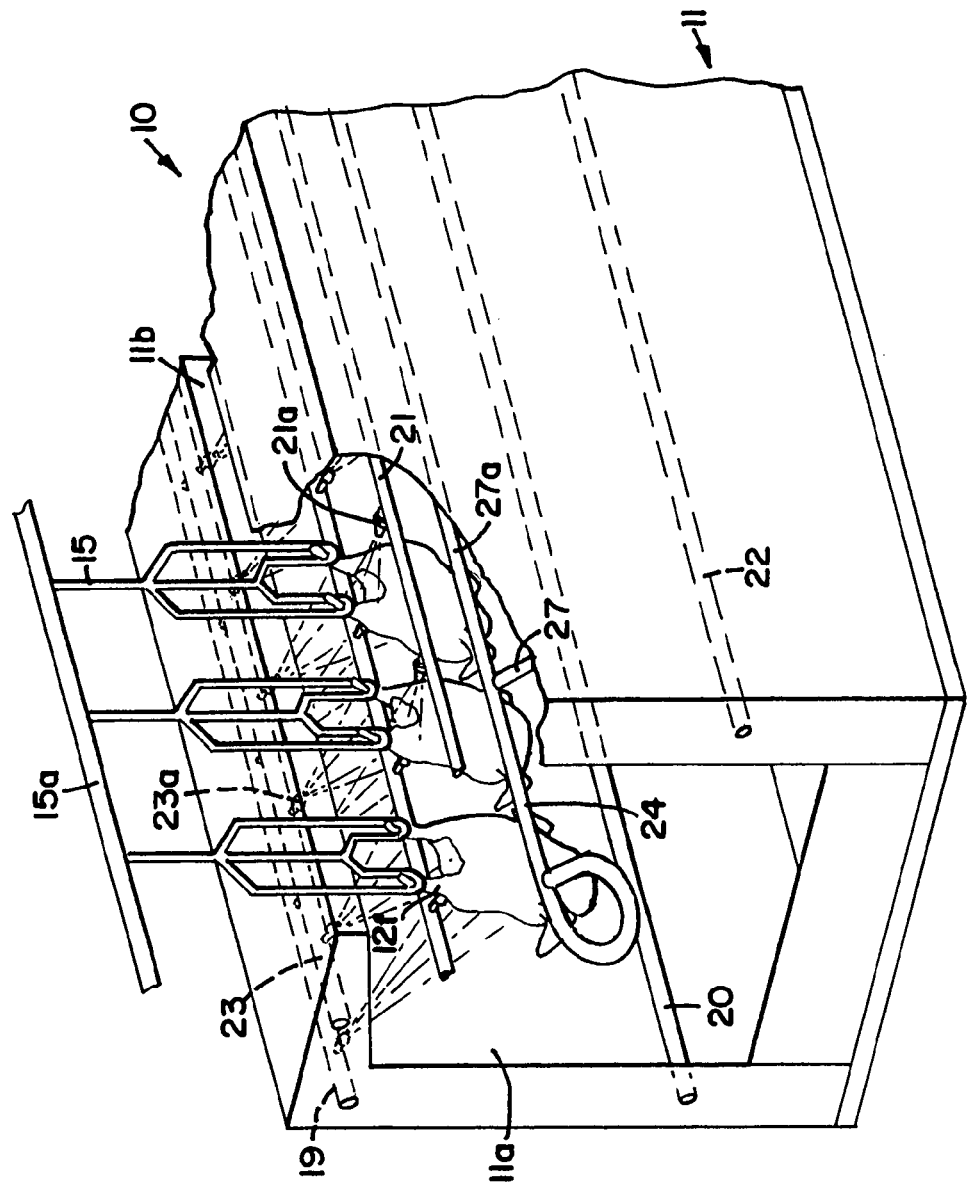
FIG. 1 is a perspective view of the apparatus for cleaning poultry according to the present invention.

Referring to the drawings, wherein like numerals represent like parts throughout the several views, there is generally disclosed at 10 an apparatus for washing eviscerated poultry carcasses. The apparatus 10 uses a cleaning fluid or solution to clean poultry carcasses, the cleaning solution may be any suitable solution and may include water, or water with chemicals added. In addition, the cleaning solution may include peroxyacetic acid and peroxyoctanoic acid as described in U.S. Pat. No. 6,514,556 entitled "Method and Composition for Washing Poultry During Processing", which is hereby incorporated by reference. It is understood that any suitable cleaning agent, antimicrobial agent, detergent, surfactant, chelating agent, defoaming agent, polyphosphate, acidulant, alkali or water softening/conditioning agent may be utilized with the present invention. Examples of these agents are peroxygens, chlorinated compounds, organic acids, chlorine dioxide, acidified sodium chlorite, and trialkali metal orthophosphates.

Figure 5A:
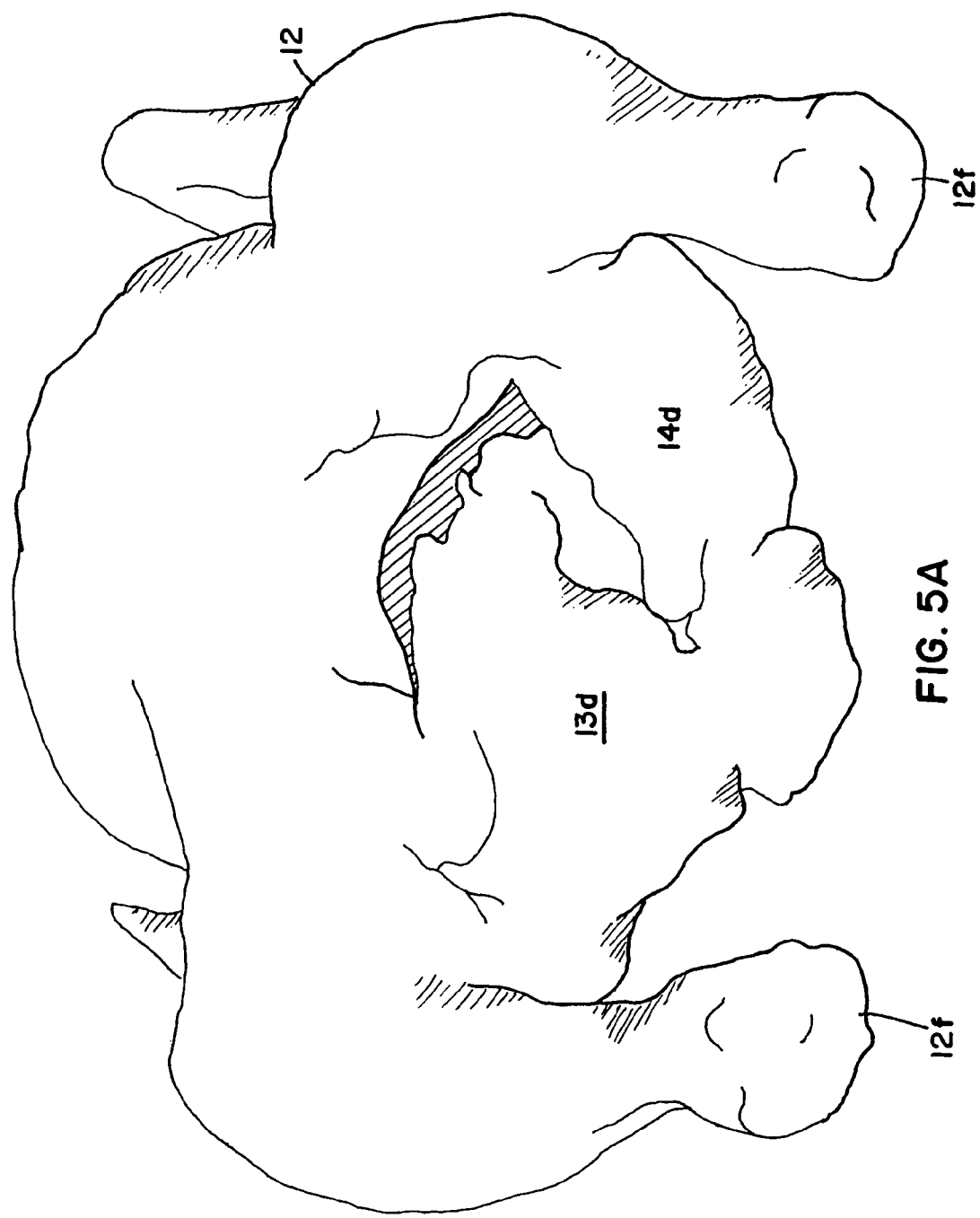
FIG. 5a is a view of the inferior and anterior (partial) surfaces of a chicken with the abdominal fat in a closed (inward) position.
Figure 5B:
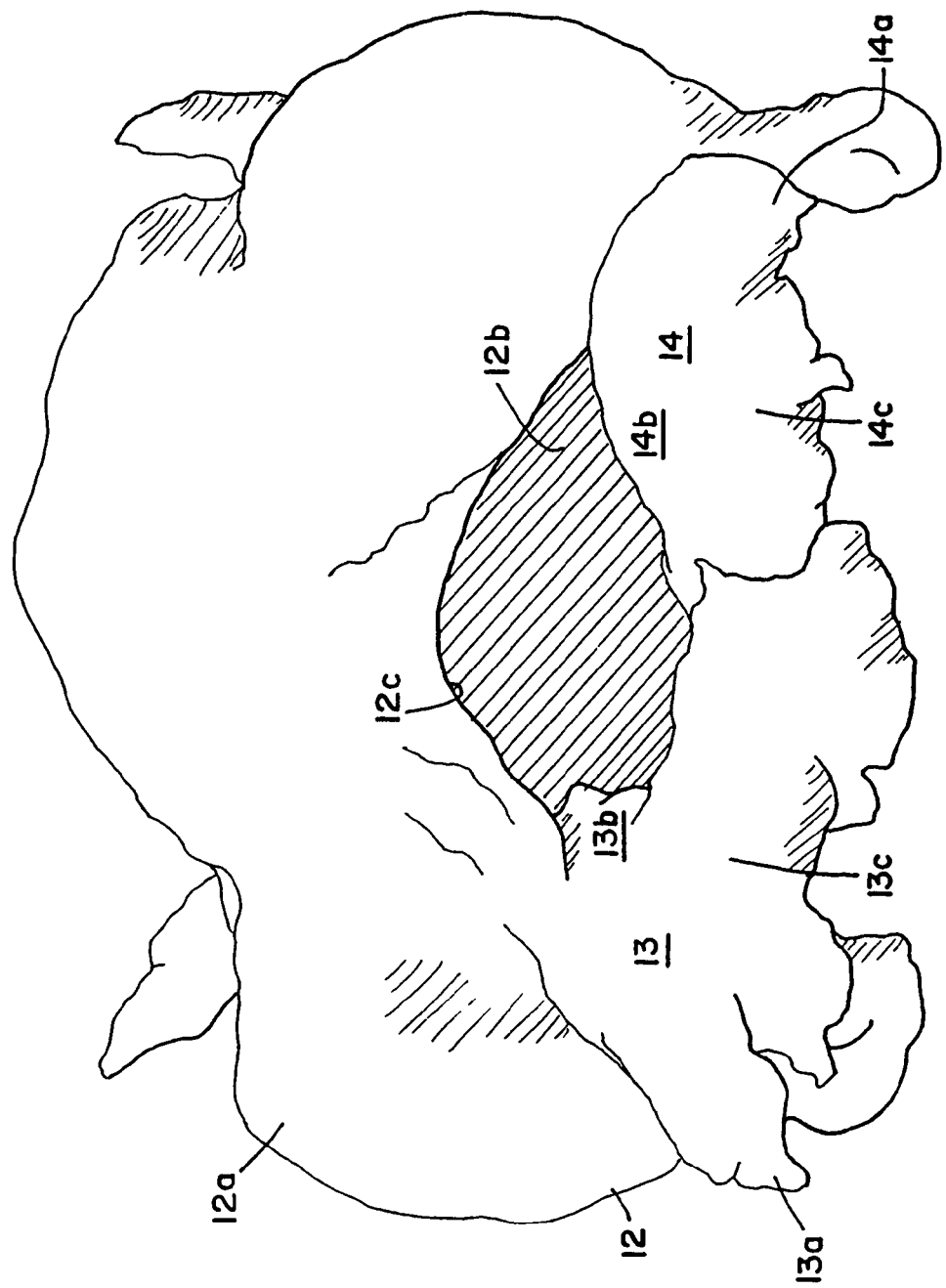
FIG. 5b is a view of the inferior and anterior (partial) surfaces of a chicken with the abdominal fat in an open (outward) position.
Figure 6A:
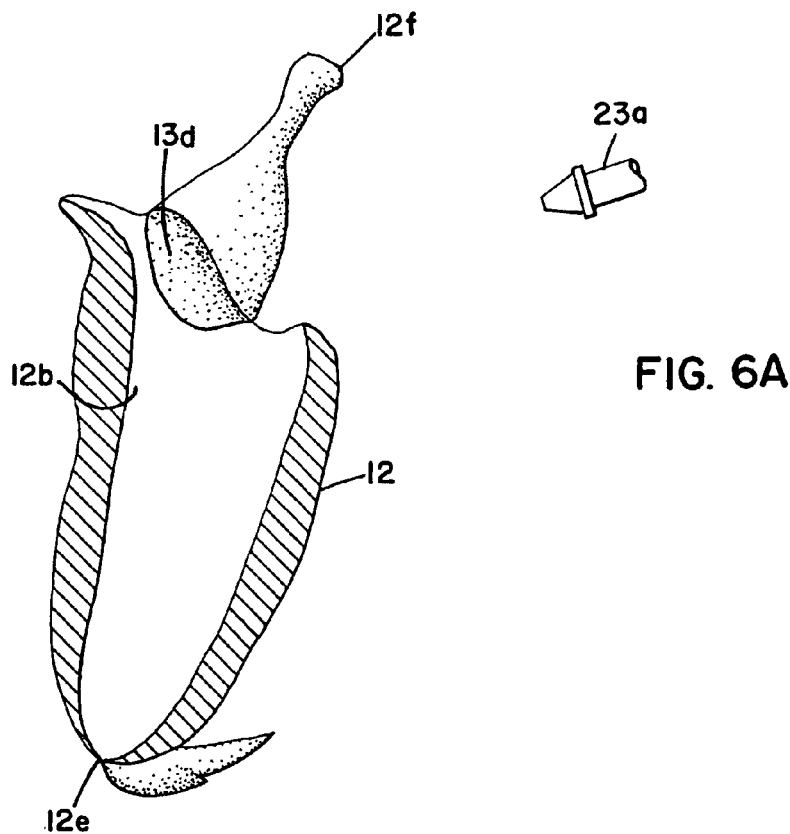
FIG. 6a is a midsagittal view of a chicken showing the closed position of the abdominal fat prior to spraying.
Figure 6B:
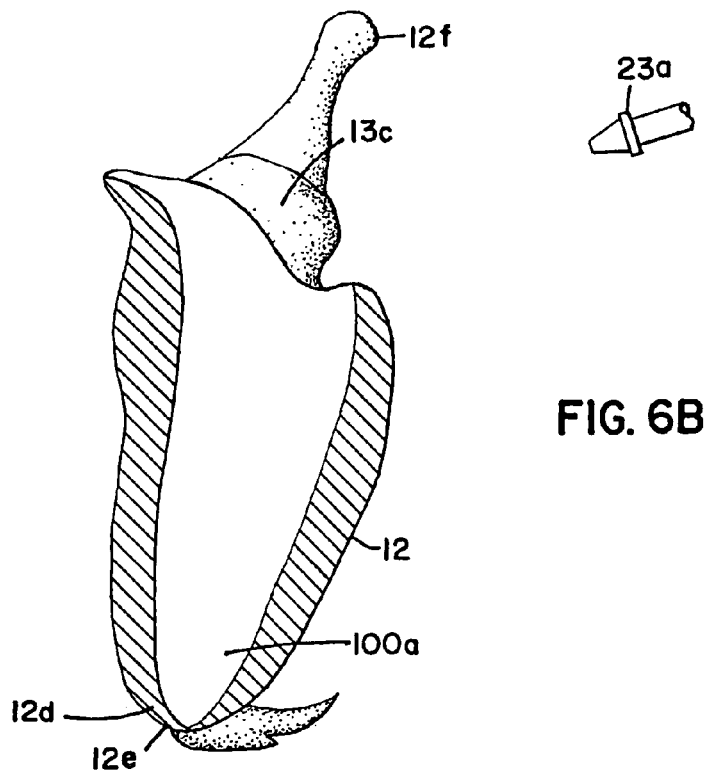
FIG. 6b is a midsagittal view of a chicken showing the open position of the abdominal fat during spraying and the abdominal fat flaps being moved away from the rear end opening.

The apparatus 10 includes a housing 11 that defines a housing interior 11a through which the eviscerated chickens 12 are conveyed. The following description is directed to a chicken, but it is understood other poultry may be washed and the chicken is shown to specifically show just one type of poultry. The chickens 12 have an exterior surface 12a, a cavity 12b having a rear end opening 12c and a neck end 12d having a neck opening 12e. The neck end 12d may have an opening 12e if the carcass has gone through the neck puller operation. This can be done either before or after the washing. The chickens 12 have a first abdominal fat flap 13 and a second abdominal fat flap 14. Both abdominal fat flaps 13, 14 have a free end 13a and 14a and a connected end 13b, 14b. The connected ends are connected to the chicken proximate the rear end opening 12c. As will be discussed more fully hereafter, FIGS. 5a and 6a show the abdominal fat flaps 13, 14 in a generally closed position and FIGS. 5b and 6b show the abdominal fat flaps 13, 14 in a generally open position. The abdominal fat flaps have an interior surface 13c, 14c and an exterior surface 13d, 14d.

The housing 11 also has a rectangular slot or opening 11b. The opening 11b is positioned to allow shackles 15 to be moved, by an overhead conveyor 15a, through the apparatus 10. The chickens 12 are held in the shackles 15 by their legs 12f. The overhead conveyor 15a and shackles 15 are typically permanently positioned in a processing facility. The apparatus 10 has a first section, generally designated at 16 and a second section, generally designated at 17. The first section 16 is utilized to clean the cavity 12b and the exterior surface 12a, while the second section 17 is utilized to clean the exterior surface 12a after the bacteria or other contaminants have been cleaned out of the cavity 12b. This arrangement is preferable, although it is understood that the functions of the two sections 16, 17 could be combined into one section.

Figure 2:
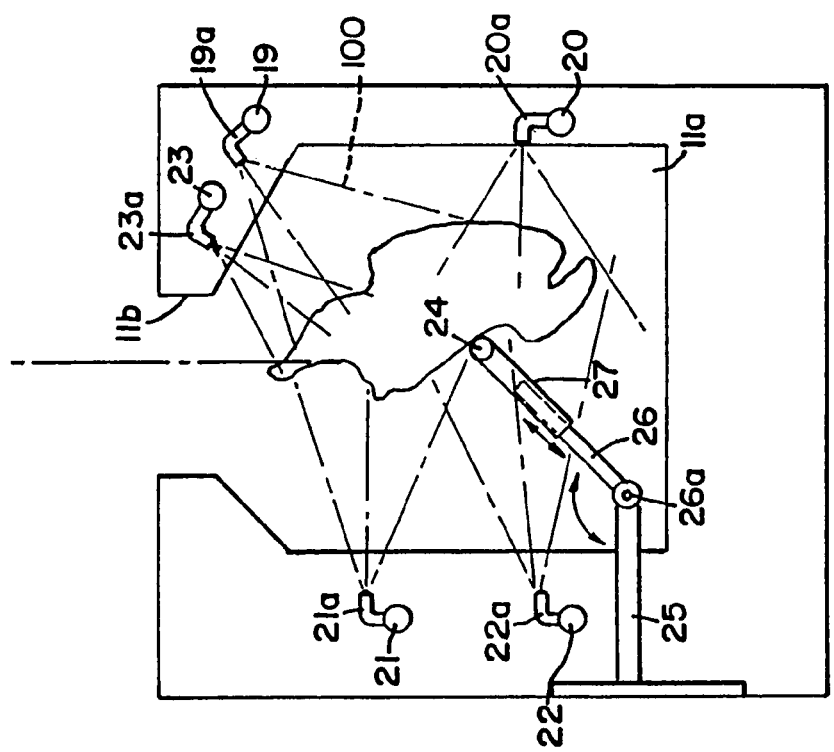
FIG. 2 is a sectional view of the apparatus shown in FIG. 1, taken generally along the lines 2-2.
Figure 4:
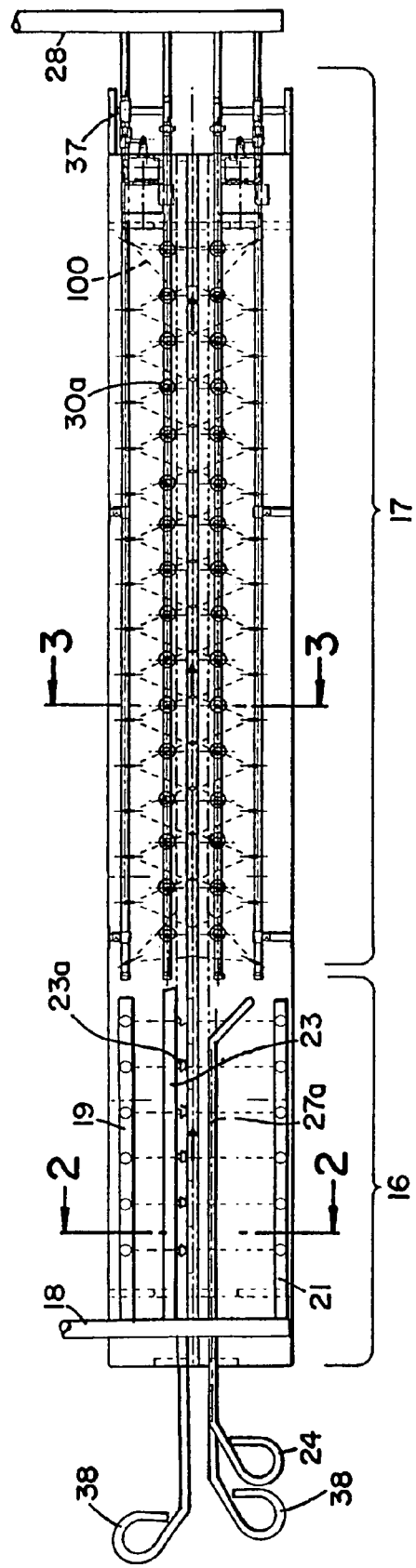
FIG. 4 is a top plan view of the apparatus shown in FIG. 1.

Referring to FIGS. 2 and 4, the housing 11 includes an inlet manifold 18 that is in fluid communication and provides cleaning solution 100 to five conduits 19-23. Conduits may be added or subtracted and the location of conduits within the housing 11 may change. Conduits may be rotated to allow spray nozzle 19a-23a aim adjustment and may be connected to a mechanism that moves the conduits in an oscillating motion. The conduits are supported in the housing interior 11a by means well known in the art and are not shown. The conduits 19-23 run the length of the first section 16. A plurality of spray nozzles 19a-23a are operatively connected to the conduits 19-23 by means well known in the art. Typically, an elbow fitting connects the conduit to the spray nozzle, such construction being well known in the art. The nozzles 19a-23a have discharge orifices that diffuse the stream of the cleaning solution. A guide bar 24 is suitably supported in the housing interior to contact the anterior or posterior side of the carcasses to tilt the carcasses from vertical. As seen in FIG. 2, the guide bar 24 is suitably supported in the housing interior 11a. As seen in FIG. 2, the carcass guide bar 24 is connected by suitable means, such as welding, to the support tubes 27. The support tubes 27 are connected to pivoting supports 26 by sliding the support tubes 27 over the pivoting supports 26 and fastening by means well known in the art that allow adjustment, such as bolting or threaded screw. The pivoting supports 26 are connected to mounting supports 25 by a pivot joint 26a well known in the art. Mounting supports 25 are connected to the housing 11 by means well known in the art such as welding.

Figure 3:
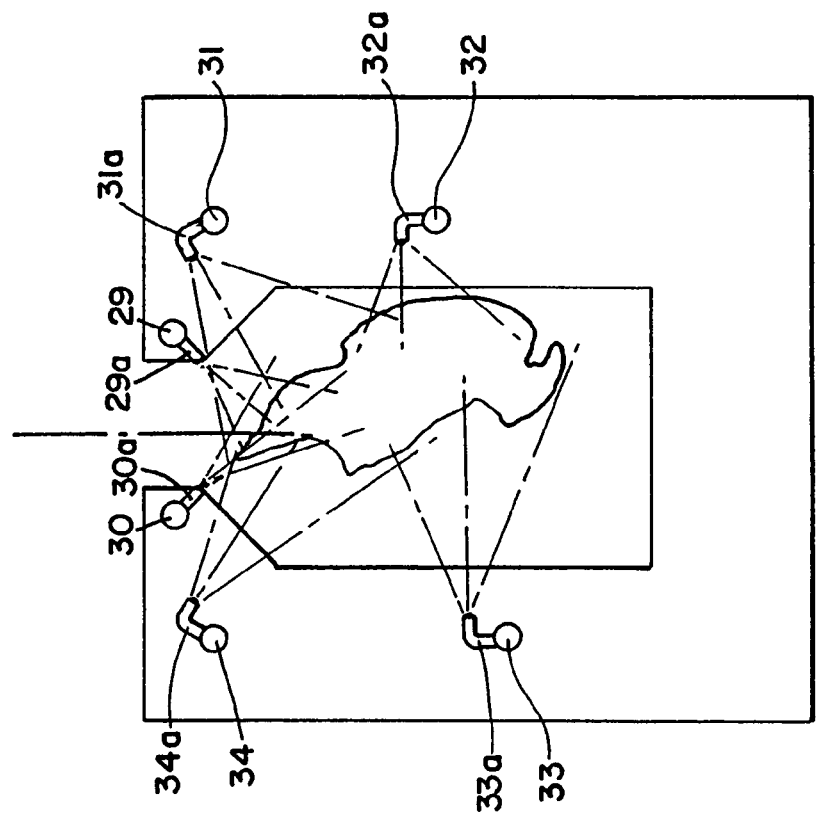
FIG. 3 is a sectional view of the apparatus shown in FIG. 1, taken generally along the lines 3-3.
Figure 7:
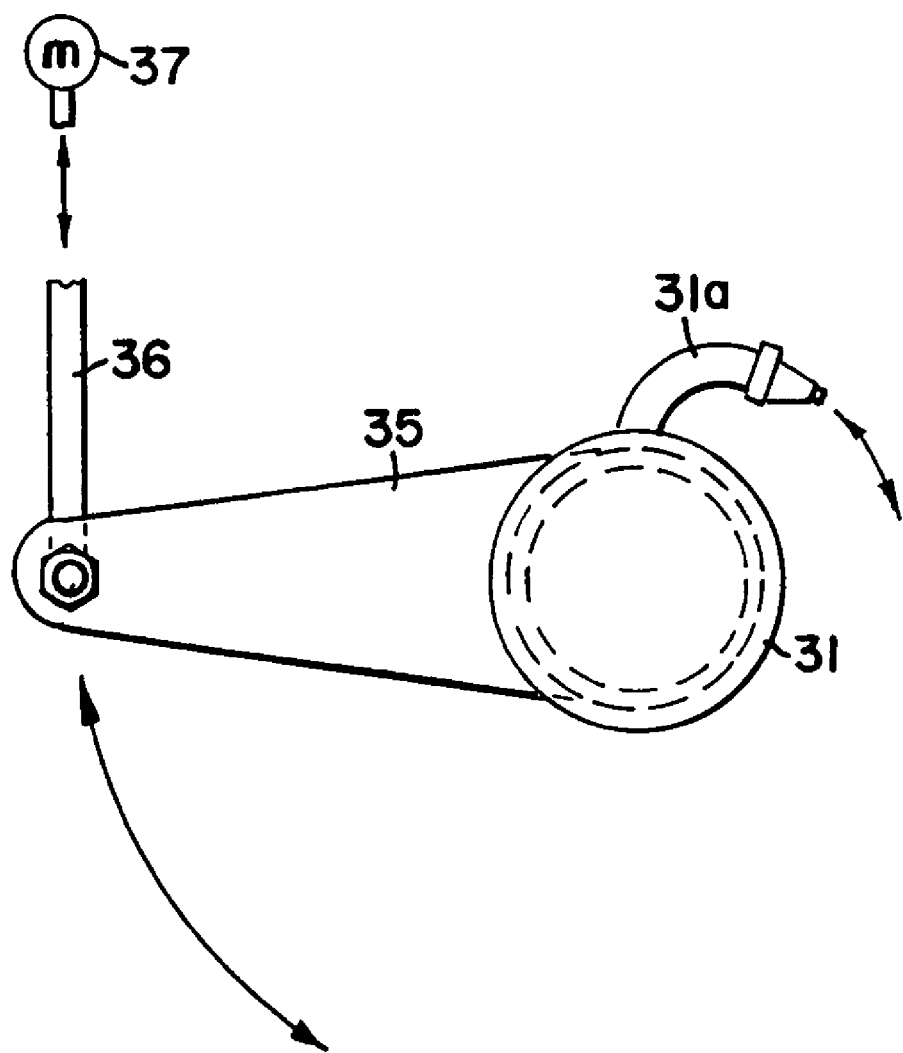
FIG. 7 is an enlarged portion of FIG. 4, showing an oscillating conduit.

Referring to FIGS. 3 and 4, the second section 17 has a second inlet manifold 28, which is similar to inlet manifold 18 and is connected to a source of cleaning solution 100. The inlet manifold 28 is operatively connected and in fluid communication to six conduits 29-34. Nozzles 29a-34a are operatively connected to and in fluid communication with the conduits 29-34. The nozzles 29a-34a are similar to nozzles 19a-22a. The conduits 29-34 extend generally along the length of section 17. The conduits 31-34 are oscillating conduits while conduits 29, 30 as well as 19-23 are fixed. Oscillating conduits are well known in the art. FIG. 7 shows a schematic representation of a typical oscillating conduit. The oscillating mechanism includes a conduit 31 with a nozzle 31a in fluid communication therewith. A flange 35 is operatively connected to the conduit 31. The flange 35 is connected by a length 36 to a motor 37. The motor 37 causes the link 36 to move and down, thereby rotating the conduit 31. As previously mentioned, the second section 17 may be incorporated into the first section 16, if desired As can be seen in FIG. 4, there is a plurality of exterior surface spray nozzles 19a-22a and 29a-34a aimed at the exterior surface 12a and a plurality of cavity spray nozzles 23a aimed at the rear end opening 12c and abdominal fat flaps 13, 14. The number of nozzles depends on the number and length of the conduits 19-23 and the desired cleaning outcome. Preferably, there are at least three nozzles 23a in linear sequence and preferably between 5 to 9 nozzles 23a.

The following are values for the nozzles 19a-23a and 29a-34a. It is understood that the critical values are for the nozzle 23a, as the other nozzles 19a-22a and 29a-34a are well known. The values are for moving the carcasses at a line speed of 14 inches per second.

TABLE 1

| | Preferred | More Preferred |
|---|---|---|
| Cavity Spray Nozzles 23a | | |
| Flow rate | 3 to 15 gallons per minute | 5 to 12 gallons per minute |
| Line pressure | 10 to 20 psi | 15 to 20 psi |
| Nozzle spacing (in linear sequence on conduit) | 1 to 6 inches | 1 to 3 inches |
| Spray distance (from spray orifice to poultry) | 4 to 15 inches | 6 to 10 inches |
| Diffused spray angle | 10 to 40 degrees | 15 to 25 degrees |

TABLE 1-continued

|  | Preferred | More Preferred |
|---|---|---|
| Spray pattern | Full cone or Flat | Flat |
| Exterior Surface Spray Nozzles 19a-22a; 29a-34a | | |
| Flow rate | 0.2 to 2 gallons per minute | 0.4 to 1 gallon per minute |
| Line pressure | 20 to 60 psi | 30 to 50 psi |
| Nozzle spacing | 4 to 18 inches | 6 to 12 inches |
| Spray distance | 4 to 18 inches | 6 to 12 inches |
| Diffused spray angle | 10 to 75 degrees | 25 to 60 degrees |
| Spray pattern | Full cone or Flat | Flat |

As can be seen, the line pressure for conduit 23 is different than conduits 19-22. Since the conduits 19-23 are all being fed from the same conduit 18, a flow restrictor (not shown) is positioned in the conduit 23 to provide appropriate line pressure. It is, of course, understood that a separate conduit could be utilized to supply this different line pressure. Further, while all nozzles have been described and shown as linear or substantially linear, it is understood that they may also be non-linear.

An effective method to wash the cavity of an eviscerated poultry carcass with a diffused spray stream originating from outside the carcass is to deliver at least 1 volume of cleaning solution for every four poultry cavity volumes in less than 0.4 second and preferably less than 0.36 seconds or less. That is, if the poultry cavity is 240 mL, at least 60 mL of solution into the cavity.

The preferred method to wash the cavity of an eviscerated poultry carcass with a diffused spray stream originating from outside the carcass is to deliver at least 1 volume of cleaning solution for every three poultry cavity volumes in less than 0.4 second and preferably less than 0.36 seconds or less. By supplying the cleaning solution in the ratios and times previously described, the cleaning solution is deflected back out the cavity for the cleaning to be described hereafter with respect to FIG. 6b.

For either method, it is preferred that the spray stream enters the cavity at an angle approximately perpendicular to the spinal column of the carcass. For either method, it is preferred that multiple spray streams in linear sequence are used. Further, it is preferred that the spray streams be 6 inches or less apart. For either method, it is preferred that the spray stream enters the cavity of a carcass that is in a non-vertical position. Further, if the carcass is hanging vertical by the legs from a shackle, it is preferred that the carcass be tilted to a non-vertical position while the spray stream is applied.

In operation, the chicken carcasses 12 are hung by their legs 12f such that the rear end opening 12c is up and the neck end 12d is down. The shackles 15 are moved on the overhead conveyor 15a such that the chicken carcasses 12 enter the housing interior 11a. Shackle guides 38, well known in the art, are also provided to guide the shackles into opening 11b. The chicken carcasses 12 enter the housing generally vertical. Then, as viewed in FIG. 2, the carcasses contact the guide bar 24 to tilt the chicken carcasses 12 from the vertical. This makes it easier for the abdominal flaps 13, 14 to deflect outward and allows better cleaning beneath the flaps. While the guide bar 24 is not necessary, it does assist in the better functioning of the apparatus 10. The bird tilt provided is shown at about 15 degrees from vertical and is preferably from 10 degrees to 45 degrees. The cleaning solution 100, which is being supplied under the conditions noted previously, cleans the exterior surface 12a and also the cavity 12b. However, the inner cavity 12b is cleaned in a manner different than that known in the prior art. The cleaning solution is applied as a diffused spray stream originating from outside the carcass and delivers at least 1 volume of cleaning solution into the cavity 12b for every four poultry cavity volumes in less than 0.4 seconds. It is preferred that the spray stream enters the cavity at an angle approximately perpendicular to the spinal column of the carcass. It is also preferred that multiple spray streams in linear sequence are used, those streams being 6 inches or less apart. The stream does not fill the cavity, but instead a portion of the cleaning fluid is deflected out the rear end opening 12c and beneath the flaps 13, 14. This allows for better cleaning beneath the abdominal fat flaps 13, 14. This action is schematically shown in FIGS. 6a, 6b.

FIG. 6a shows the chicken carcass 12 after it has been moved from vertical by the guide bar. This presents the rear end opening 12c better to the nozzle 23a. In this closed position, the abdominal flaps 13, 14 tend to overlie each other and close off the cavity 12b. The cleaning fluid is preferably supplied from the ventral side (as seen in FIG. 1) to the rear end opening 12c, although from other sides will also be acceptable.

Then, in FIG. 6b, the effect of the cleaning solution 100 being sprayed from the nozzle 23a is shown. It is understood from previous discussions that the nozzle 23a is preferably six to ten inches away from the opening 12c. The cleaning solution 100 is supplied under conditions which cause the cleaning solution 100 to deflect back out of the rear end opening 12c after the cleaning solution has hit other portions of the side walls of the cavity 12b. The stream of cleaning solution is going in a stream inside the cavity and the stream is deflected from the inward movement, the usual direction, to be moving in another direction that is back outside of the cavity. There is some accumulation 100a of the cleaning solution 100 at the bottom of the cavity 12b. This accumulation 100a will tend to exit out of the neck opening 12e or later be discharged when the carcass is removed from the shackles. The remaining cleaning solution 100 is deflected out under such conditions as to cause the abdominal flaps 13, 14 to go into the open position (FIG. 5b). The solution is deflected back out and contacts the interior surface of the abdominal fat and raises the abdominal fat to effectively remove any pockets that may form to trap contaminants. This provides for effective cleaning of the bacteria or other contaminants which may exist under the abdominal flaps 13, 14. The conditions under which the cleaning solution 100 is supplied have been previously discussed with respect to time and volume. It is understood that these or other suitable combinations, based on the particular configurations of the assembly line and the chicken carcasses 12 may vary the conditions. However, the cleaning solution is supplied under such conditions as to not just float the abdominal flaps slightly up as the cavity 12b is flooded, as in the prior art, but instead the abdominal flaps are deflected up such that their free ends 13a, 14a move from a closed position (FIG. 5a) to a position where the free ends 13a, 14a are in an open position (FIG. 5b).

EXAMPLES

In all examples, spray nozzles 23a (Spraying Systems Co. VeeJet® spray nozzles) in linear sequence were used to spray diffused water streams into the cavity of an eviscerated chicken carcass moving past the nozzles. The spray stream entered the cavity at an angle approximately perpendicular to the spinal column of the carcass. The carcass had a 240 mL cavity volume. Spray nozzles were spaced on either 3- or 6-inch centers.

Results were recorded as follows:

0=Not effective (spray deflected in the cavity, sometimes out the rear end opening, the abdominal fat flaps in a closed position)

+=Effective cavity washing (spray deflected in the cavity, out the rear end opening, the abdominal fat flaps sometimes in an open position)

++=More effective cavity washing (spray deflected out of the cavity, out the rear end opening, the abdominal fat flaps in an open position)

EXAMPLE 1

0.18 Second Exposure Time to Each Spray Stream (6 Inches on Center)

| Line Pressure | Volume of Water (to Nearest 10 mL) Delivered Into the Cavity per Spray Stream | | | |
|---|---|---|---|---|
| | 30 mL | 40 mL | 60 mL | 80 Ml |
| 10 psig | 0 | 0 | + | ++ |
| 20 psig | 0 | 0 | + | ++ |

EXAMPLE 2

0.18 Second Exposure Time to Each Spray Stream (3 Inches on Center)

| Line Pressure | Volume of Water (to Nearest 10 mL) Delivered Into the Cavity per Spray Stream | | | |
|---|---|---|---|---|
| | 30 mL | 40 mL | 60 mL | 80 mL |
| 10 psig | 0 | + | + | ++ |
| 20 psig | 0 | + | ++ | ++ |

EXAMPLE 3

0.36 Second Exposure Time to Each Spray Stream (6 Inches on Center)

| Line Pressure | Volume of Water (to Nearest 10 mL) Delivered Into the Cavity per Spray Stream | | | |
|---|---|---|---|---|
| | 40 mL | 60 mL | 80 mL | 110 mL |
| 10 psig | 0 | + | ++ | ++ |
| 20 psig | + | + | ++ | ++ |

EXAMPLE 4

0.36 Second Exposure Time to Each Spray Stream (3 Inches on Center)

| Line Pressure | Volume of Water (to Nearest 10 mL) Delivered Into the Cavity per Spray Stream | | | |
|---|---|---|---|---|
| | 40 mL | 60 mL | 80 mL | 110 mL |
| 10 psig | 0 | + | ++ | ++ |
| 20 psig | 0 | + | ++ | ++ |

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. An apparatus for washing eviscerated poultry carcasses having legs, an exterior surface, abdominal fat flaps, a cavity having a rear end opening and a neck end, the apparatus comprising:
   a) a conveyor for conveying the carcasses, hung by the legs, through a housing;
   b) the housing having an inlet and an outlet through which the carcasses pass;
   c) a guide bar positioned in the housing and positioned to contact the carcasses and raise their neck ends to tilt the poultry carcasses from vertical;
   d) a first set of multiple spray nozzles aimed at the rear end opening of the poultry carcass, and having a ten degree or greater spray angle, for providing a diffused stream of cleaning fluid into the cavity from a direction and at a volume over time of 3 to 15 gallons per minute from each nozzle, so that a portion of the cleaning fluid is deflected out the rear end opening, the deflected cleaning fluid resulting in movement of an unattached end of the abdominal fat flaps near the rear end opening, outwardly and away from the rear end opening; and
   e) a second set of multiple spray nozzles for spraying the exterior surface with a cleaning fluid.

2. The apparatus of claim 1, wherein the second set of nozzles are oscillating.

3. The apparatus of claim 1, wherein the cleaning fluid flows at a line pressure of from 10 to 20 psi from each nozzle of the first set of multiple spray nozzles.

4. The apparatus of claim 3, wherein the first set of multiple spray nozzles are spaced from a distance of from 6 to 10 inches from the rear end opening.

5. The apparatus of claim 4, wherein the first set of multiple spray nozzles comprises at least three spray nozzles.

6. The apparatus of claim 1, wherein the second set of nozzles have a flow rate from each nozzle of the second set of nozzles of 0.2 gallons to 2.0 gallons per minute and the cleaning fluid flows from the second set of nozzles at a line pressure of 20 psi or greater.

* * * * *